(12) United States Patent
Vaught et al.

(10) Patent No.: US 9,135,508 B2
(45) Date of Patent: Sep. 15, 2015

(54) ENHANCED USER EYE GAZE ESTIMATION

(75) Inventors: Benjamin Isaac Vaught, Seattle, WA (US); Robert L. Crocco, Jr., Seattle, WA (US); John Lewis, Bellevue, WA (US); Jian Sun, Beijing (CN); Yichen Wei, Beijing (CN)

(73) Assignee: Microsoft Technology Licensing, LLC., Redmond, WA (US)

( * ) Notice: Subject to any disclaimer, the term of this patent is extended or adjusted under 35 U.S.C. 154(b) by 174 days.

(21) Appl. No.: 13/331,285

(22) Filed: Dec. 20, 2011

(65) Prior Publication Data

US 2013/0154918 A1    Jun. 20, 2013

(51) Int. Cl.
    *G06K 9/00* (2006.01)
    *G06F 3/01* (2006.01)
    *G02B 27/01* (2006.01)

(52) U.S. Cl.
    CPC ............ *G06K 9/00671* (2013.01); *G06F 3/013* (2013.01); *G06K 9/00617* (2013.01); *G02B 27/017* (2013.01); *G06K 9/0061* (2013.01)

(58) Field of Classification Search
    CPC ............... G02B 27/01; G02B 27/0101; G02B 27/0103; G02B 2027/0138; G02B 2027/014; G02B 2027/0178; G02B 27/0093; G02B 27/17; G06F 3/013; G06K 9/00221; G06T 2207/30201; G09B 9/307; A42B 3/042; B60R 25/255; F41G 3/225
    USPC ................................ 351/210; 345/8; 382/103
    See application file for complete search history.

(56) References Cited

U.S. PATENT DOCUMENTS

| | | | |
|---|---|---|---|
| 6,246,779 B1 * | 6/2001 | Fukui et al. | 382/103 |
| 6,806,898 B1 | 10/2004 | Toyama et al. | |
| 7,130,447 B2 | 10/2006 | Aughey et al. | |
| 7,742,623 B1 * | 6/2010 | Moon et al. | 382/103 |
| 2006/0115125 A1 * | 6/2006 | Yuasa et al. | 382/104 |
| 2010/0204608 A1 | 8/2010 | Sugio et al. | |
| 2011/0018862 A1 | 1/2011 | Epps | |
| 2011/0279666 A1 * | 11/2011 | Strombom et al. | 348/78 |

FOREIGN PATENT DOCUMENTS

WO    WO 2010051037 A1 *    5/2010

OTHER PUBLICATIONS

Chen, et al., "A Robust 3D Eye Gaze Tracking System using Noise Reduction", In Proceedings of the 2008 symposium on Eye tracking research & applications, Mar. 26-28, 2008, 8 pages.*

(Continued)

*Primary Examiner* — Dwayne Bost
*Assistant Examiner* — Stefan M Oehrlein
(74) *Attorney, Agent, or Firm* — Miia Sula; Judy Yee; Micky Minhas (57) ABSTRACT

Systems, methods, and computer media for estimating user eye gaze are provided. A plurality of images of a user's eye are acquired. At least one image of at least part of the user's field of view is acquired. At least one gaze target area in the user's field of view is determined based on the plurality of images of the user's eye. An enhanced user eye gaze is then estimated by narrowing a database of eye information and corresponding known gaze lines to a subset of the eye information having gaze lines corresponding to a gaze target area. User eye information derived from the images of the user's eye is then compared with the narrowed subset of the eye information, and an enhanced estimated user eye gaze is identified as the known gaze line of a matching eye image.

20 Claims, 6 Drawing Sheets

(56) References Cited

OTHER PUBLICATIONS

Weidenbacher, et al., "A Comprehensive Head Pose and Gaze Database", In 3rd IET International Conference on Intelligent Environments, Sep. 24-25, 2007, 4 pages.

Morgan, Kathryn, "Computer Gaze Estimation using Image Segmentation, Feature Extraction, and Neural Networks", Retrieved on: Apr. 8, 2011, Available at: http://digital.cs.usu.edu/~xqi/Teaching/REU05/Website/Katie/KatieFinalPaper.pdf.

Hammal, et al., "Eyes Segmentation Applied to Gaze Direction and Vigilance Estimation", In Proceedings of the 3rd International Conference on Advances in Pattern Recognition, Aug. 22-25, 2005, 10 pages.

* cited by examiner

ENHANCED USER EYE GAZE ESTIMATION

BACKGROUND

Wearable computing devices, also known as user-mounted devices or head-mounted devices or head-mounted displays (HMDs), have begun to increase in popularity in recent years. HMDs are commonly integrated into gaming systems but may be used in a variety of other contexts. HMDs typically include outward-facing sensors that gather data about the user's environment as well as inward-facing sensors that track the user's eye movements. Current eye tracking technology, however, is generally limited to simply recording the eye's movements. A more robust eye tracking system is needed.

SUMMARY

Embodiments of the present invention relate to systems, methods, and computer media for estimating user eye gaze. Using the systems and methods described herein, a plurality of images of a user's eye are acquired. At least one image of at least part of the user's field of view is acquired. At least one gaze target area in the at least one image of at least part of the user's field of view is determined based on at least one of the plurality of images of the user's eye. An enhanced user eye gaze is then estimated.

The estimation is performed by narrowing a database of eye information and corresponding known gaze lines to a subset of the eye information having gaze lines corresponding to the at least one determined gaze target area. User eye information derived from the plurality of images of the user's eye is then compared with the narrowed subset of eye information, and an enhanced estimated user eye gaze is identified as the known gaze line of matching eye information in the subset of the eye information.

Prior to comparison with the narrowed subset of eye information, the images of the user's eye may be segmented according to a comprehensive segmentation model that segments the user's eye and the region around the user's eye into a plurality of features. The narrowed subset of eye information is also segmented according to the comprehensive segmentation model. The plurality of features of the images of the user's eye are then compared to the features segmented from the narrowed subset of eye information to determine the matching eye image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Embodiments of the present invention are described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention relate to systems, methods, and computer media for estimating user eye gaze. In accordance with embodiments of the present invention, images of both a user's eye and the user's field of view are acquired. The images may be acquired using inward-facing and outward-facing sensors on an HMD. A "target identification" eye gaze estimation approach and an exemplar-based eye gaze estimation approach are integrated to provide an enhanced estimated user eye gaze and to infer or determine user intent. With user intent information, an HMD can provide alerts or context-relevant information, emphasize particular menu items or information, begin particular functions, etc. to provide a fluid wearable computing experience.

The target identification approach involves analyzing images of a user's eye, and based on estimated eye geometry and features, determining an estimated eye gaze. The gaze (also referred to herein as a gaze line) is projected from the user's eye to identify virtual or real targets in the user's field of view that the user may be looking at. A gaze target area can then be determined around the gaze target.

The exemplar-based approach estimates eye gaze by matching a user's eye information to eye information in a database to identify the closest match. The user's eye information and the eye information in the database can be, among other things, 2D images or 3D eye models constructed from a plurality of 2D eye images. The eye information for each eye in the database has a known gaze. When a match is identified, the known gaze is used as the estimated gaze. The target-fitting approach narrows the range of database information analyzed in the exemplar-based approach, allowing eye matching to occur significantly faster than could occur with an exemplar-based approach alone. This increase in speed reduces eye tracking lag and provides a more fluid wearable computing experience.

In one embodiment of the present invention, a plurality of images of a user's eye are acquired. At least one image of at least part of the user's field of view is acquired. At least one gaze target area in the at least one image of at least part of the user's field of view is determined based on at least one of the plurality of images of the user's eye. An enhanced user eye gaze is then estimated. The estimation is performed by: narrowing a database of eye information and corresponding known gaze lines to a subset of the eye information having gaze lines corresponding to the at least one determined gaze target area; comparing user eye information derived from the plurality of images of the user's eye to the narrowed subset of eye information; and identifying the known gaze line of matching eye information in the subset of the eye information as an enhanced estimated user eye gaze.

In another embodiment, a data component acquires a plurality of images of a user's eye and at least one image of at least part of the user's field of view. A gaze target component determines at least one gaze target area in the at least one image of at least part of the user's field of view based on at least one of the plurality of images of the user's eye. An eye segmentation component segments the plurality of images of the user's eye into a plurality of features according to a comprehensive segmentation model, the segmentation model including (1) the user's eye and (2) the region around the user's eye within approximately one and one half inches of the eyelids when open. A database stores eye information and corresponding known gaze lines. An estimation component estimates an enhanced user eye gaze by: narrowing the database of eye information to a subset of the eye information having gaze lines corresponding to the at least one gaze target area determined by the gaze target component; comparing the segmented plurality of images of the user's eye with the narrowed subset of the eye information, wherein the eye information stored in the gaze database is also segmented according to the comprehensive segmentation model; and identifying the known gaze line of matching eye information in the subset of the eye information as an enhanced estimated user eye gaze.

In still another embodiment, a plurality of images of a user's eye are acquired. At least one image of at least part of the user's field of view is acquired. A first estimated gaze is determined based on at least one of the plurality of images of the user's eye. At least one virtual or real visual target in the at least one image of at least part of the user's field of view is identified that corresponds to the first estimated gaze. For each virtual or real visual target, a gaze target area in the user's field of view that encompasses at least part of the corresponding virtual or real visual target is determined.

At least one of the plurality of images of the user's eye is segmented into a plurality of features according to a comprehensive segmentation model. The segmentation model includes both the user's eye and the region around the user's eye within approximately one and one half inches of the eyelids when open. A database of eye information and corresponding known gaze lines is accessed. A subset of the eye information in the database is identified that has known gaze lines within at least one of the determined gaze target areas. The segmented features of the at least one of the plurality of images of the user's eye are compared with the subset of the eye information stored in the database. The known gaze line of matching eye information in the database is identified as an enhanced estimated gaze.

Figure 1:
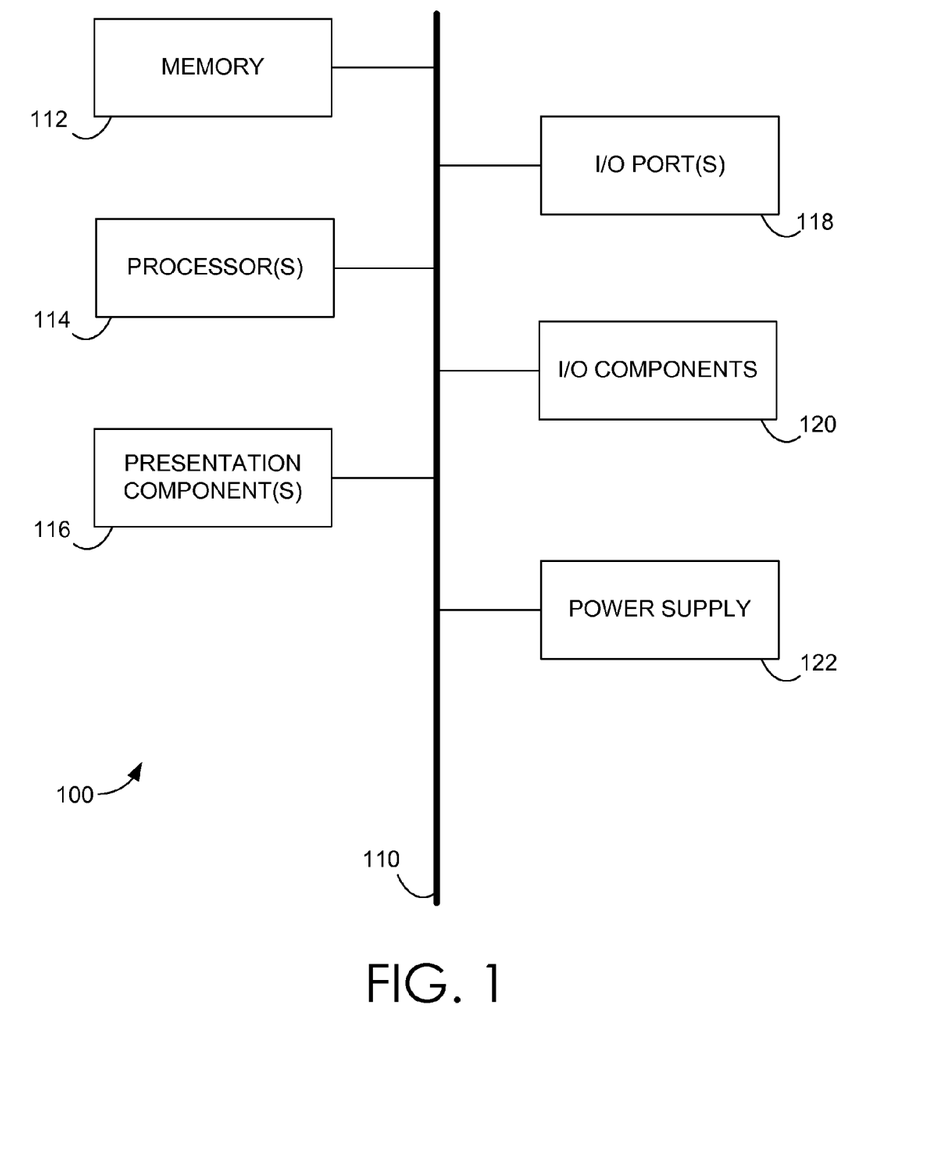
FIG. 1 is a block diagram of an exemplary computing environment suitable for use in implementing embodiments of the present invention.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, etc. Embodiments of the present invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. It is recognized that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Communication media typically embodies computer-readable instructions, data structures, program modules, or other data in a modulated data signal such as a carrier wave. The term "modulated data signal" refers to a propagated signal that has one or more of its characteristics set or changed to encode information in the signal. By way of example, and not limitation, communication media includes wired media, such as a wired network or direct-wired connection, and wireless media such as acoustic, RF, infrared, radio, microwave, spread-spectrum, and other wireless media. Combinations of the above are included within the scope of computer-readable media.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As discussed previously, embodiments of the present invention relate to systems, methods, and computer media for estimating user eye gaze. Embodiments of the present invention will be discussed with reference to FIGS. 2-7.

Figure 2:
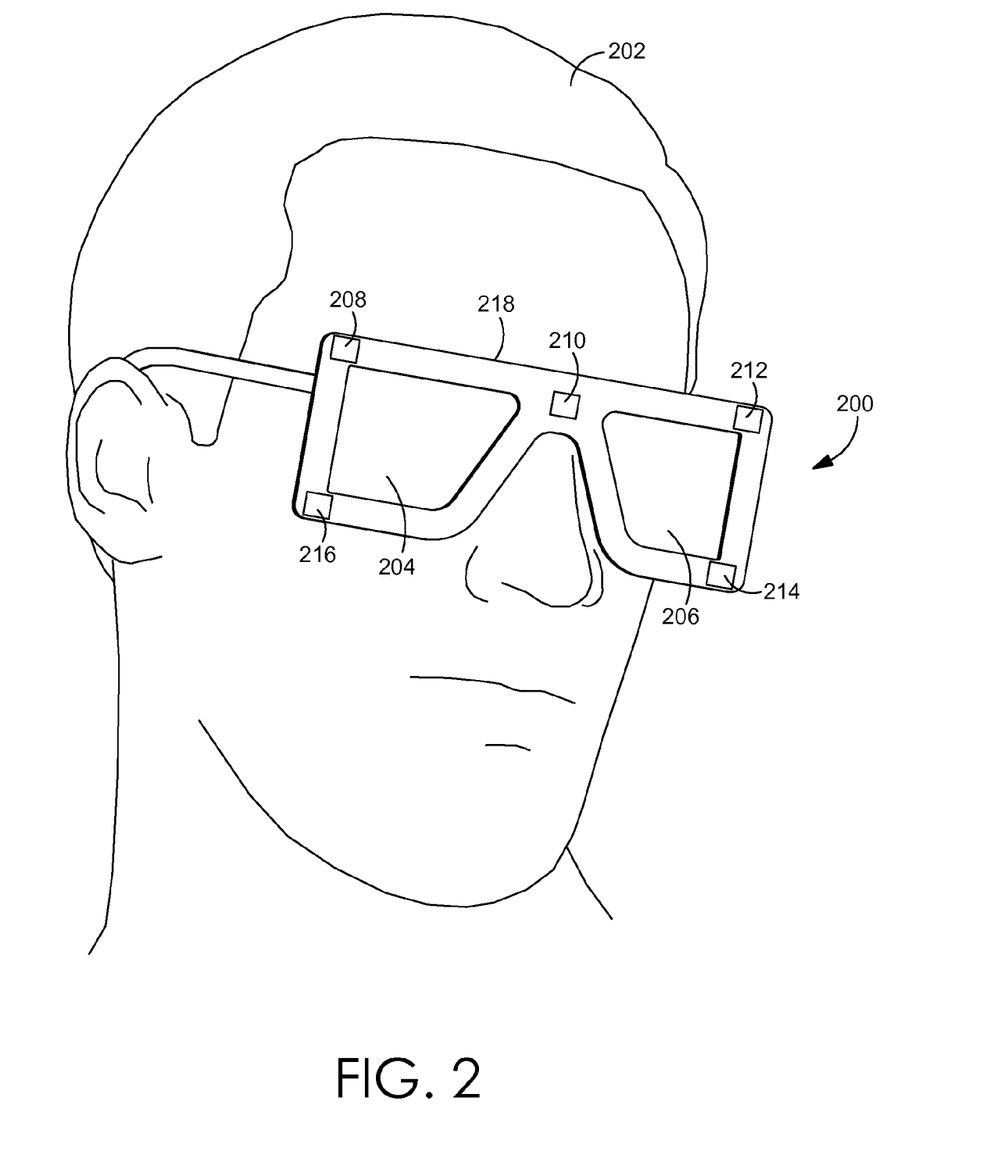
FIG. 2 is a perspective view of an exemplary HMD worn by a user in accordance with embodiments of the present invention.

FIG. 2 illustrates an exemplary head-mounted device (HMD) 200 worn by a user 202. HMD 200 is a "sensor-rich" device that includes various sensors for gathering information about the user and the environment around the user. HMD 200 is a "see-through" device in which user 202 views the surrounding environment using his own visual sense by looking through displays 204 and 206 but is also provided various additional information on displays 204 and 206.

HMD 200 includes sensors 208, 210, 212, 214, and 216. Sensors 208, 210, 212, 214, and 216 are outward-facing sensors that gather information describing the user's environment and surroundings. These sensors are shown incorporated into frame 218 of HMD 200 at various points, but it is contemplated that sensors can be incorporated into HMD 200 at any location. Sensors 208, 210, 212, 214, and 216 may be any combination of sensors, including depth sensors, cameras, and other sensors. Depth sensors may be infrared (IR) sensors that measure time of flight between a transmitted signal and a received reflection or retransmission. Cameras may be IR or visible spectrum, black and white or red-green-blue (RGB) cameras. In some embodiments, the parallax between images from two different cameras can be used to measure depth much as a person's two eyes provide depth perception.

HMD 200 may also include one or more inward-facing eye-tracking sensors, not shown in FIG. 2. Eye-tracking sensors provide images of a user's eye, for example by a high-speed RGB or IR camera. In one embodiment, for example, light sources such as LEDs are activated and a camera aimed at the user's eye takes an image of the glints reflecting from the eye. In one specific embodiment, four light sources result in four glints.

Electronics and computer media for processing data acquired by sensors 208, 210, 212, 214, and 216 may be embedded in frame 218 of HMD 200. HMD 200 can communicate wirelessly with external devices via, for example, Bluetooth® or other technology. (Bluetooth is a registered trademark of the Bluetooth Special Interest Group.) In some embodiments, acquired data is transmitted wirelessly to a separate device for processing. HMD 200 is shown resembling a pair of glasses for simplicity. The actual design of any particular user-mounted device and the number and arrangement of sensors may vary depending upon the sensors included and desired function.

Figure 3:
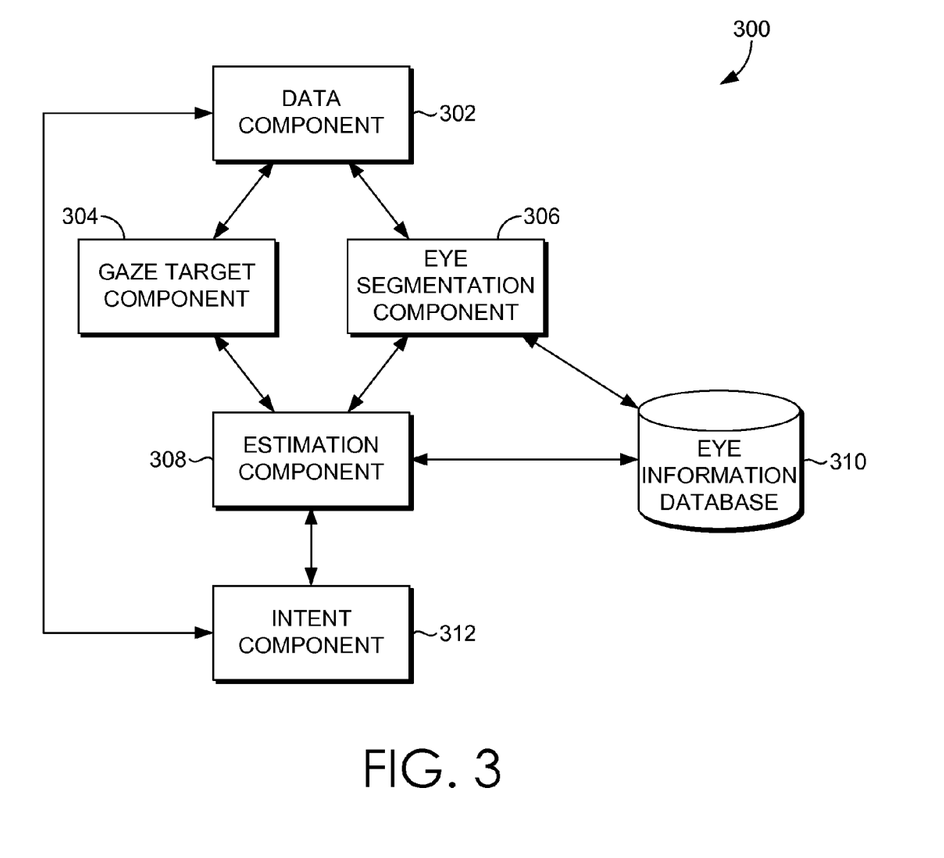
FIG. 3 is a block diagram of an exemplary user eye gaze estimation system in accordance with embodiments of the present invention.

FIG. 3 is a block diagram of an exemplary user eye gaze estimation system 300. Data component 302 acquires a plurality of images of a user's eye and at least one image of at least part of the user's field of view. In one embodiment, images of the user's eye are taken using a high-speed RGB or IR camera capable of shooting, for example, 100 frames per second and communicated to data component 302. In another embodiment, the at least one image of at least part of the user's field of view is taken by an RGB or IR camera, high-speed or standard. The cameras taking the images of both the user's eye and the user's field of view may be integrated into an HMD such as HMD 200 in FIG. 2.

A gaze target component 304 determines at least one gaze target area in the at least one image of at least part of the user's field of view based on at least one of the plurality of images of the user's eye. In one embodiment, gaze target component 304 determines a first estimated gaze based on at least one of the plurality of images of the user's eye. That is, by analyzing the geometry and orientation of the user's eye as captured in an image, gaze target component 304 estimates a gaze line of where the user's eye is looking. In some embodiments, gaze target component 304 considers a 3D model of the human eye and estimates the cornea center for the user's eye and pupil center for the user's eye. A gaze line is calculated that runs from the cornea center through the pupil center, adjusted for any calibration that has been performed. This gaze line is the first estimated gaze.

Gaze target component 304 then identifies at least one virtual or real visual target in the at least one image of at least part of the user's field of view corresponding to the first estimated gaze. The first estimated gaze is projected from the user's eye, and real or virtual objects in the user's field of view that are intersected by the first estimated gaze, are near the first estimated gaze, or are likely to viewing targets based on the first estimated gaze and detected acceleration or deceleration are then identified as gaze targets. Virtual targets can be, for example, images or menu items displayed on the display area of an HMD, such as displays 204 and 206 of HMD 200 in FIG. 2. In some embodiments, a plurality of visual targets are identified based on the first estimated gaze.

Figure 4:
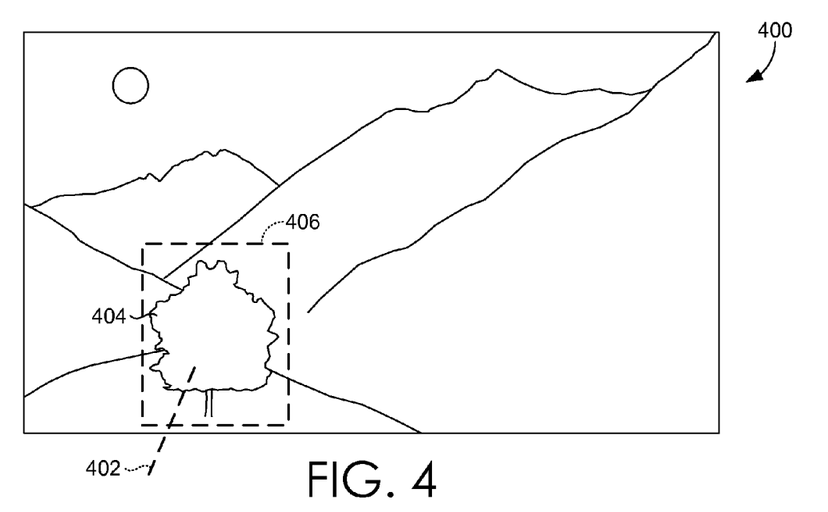
FIG. 4 is a perspective view of an exemplary gaze target and corresponding gaze target area in accordance with embodiments of the present invention.

For each virtual or real visual target, a gaze target area in the user's field of view is determined that encompasses at least part of the corresponding virtual or real visual target. An example of a real visual target and corresponding gaze target area is shown in FIG. 4. Image 400 is an image of at least part of a user's field of view. In this case, the user is viewing a landscape including a tree, mountains, and the sun. Gaze line 402 intersects real visual target 404, a tree. Gaze target area 406 encompasses real visual target 404.

In some embodiments, the gaze target area may cover only a portion of the object. For example, gaze target area 406 could be determined to only cover the canopy of the tree. Gaze target area 406 effectively broadens gaze line 402. In some embodiments, when gaze line 402 is determined with a higher level of confidence, gaze target area 406 is smaller, and when gaze line 402 is determined with a lower level of confidence, gaze target area 406 is larger to account for the lower confidence in gaze line 402. In other embodiments, gaze target area 406 is large enough to encompass all or substantially all of gaze target 404, independent of confidence in gaze line 402.

Returning now to FIG. 3, eye segmentation component 306 segments the plurality of images of the user's eye into a plurality of features according to a comprehensive segmentation model, the segmentation model including (1) the user's eye and (2) the region around the user's eye. In one embodiment, the region within approximately one and one-half inches of the eyelids when open is included. Various eye segmentation models exist, but none of these models currently provide a comprehensive segmentation that includes the eye itself and the surrounding areas. Segmenting the eye as well as the area around the eye allows for identification of a large number of features that can be matched against stored eye information in the event that particular eye features are occluded in any given image.

Figure 5:
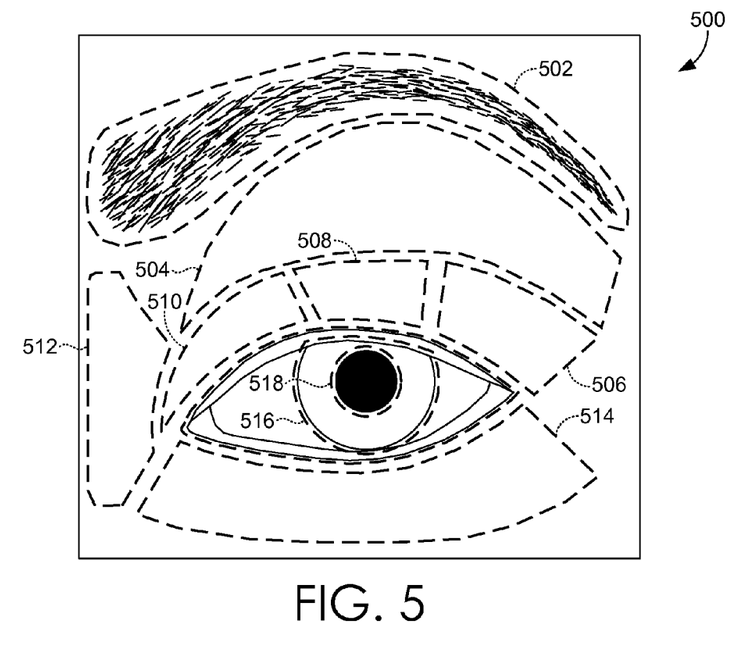
FIG. 5 is an exemplary eye segmentation based on a comprehensive segmentation model in accordance with embodiments of the present invention.

FIG. 5 illustrates an exemplary comprehensive segmentation model 500. Areas 502, 504, 506, 508, 510, 512, 514, 516, and 518, outlined with dotted lines, are merely exemplary features into which an eye can be segmented. Various features around the eye change in particular ways for particular movements, and a number of features may be useful for determining user eye gaze. A number of comprehensive segmentation models are contemplated.

Returning now to FIG. 3, eye information database 310 contains eye information and corresponding known gaze lines. The eye information in the database can be, among other things, 2D images or 3D eye models constructed from a plurality of 2D eye images. The eye information in eye information database 310 is segmented in the same way as user eye images to allow feature comparison and eye matching. Eye information database 310 may be populated by gathering images of a number of users of different genders, ethnicities, and/or facial structures gazing at known points or objects. For example, a user may gaze at points in a 3×3 grid, and each image is recorded and added to the eye information database. In some embodiments, only eye images for the particular user are included in eye information database 310. Such images may be established by calibrating with the user. A 3×3 or other grid could be used to gather images of the user's eye. Randomly selected gaze target points could also be presented to the user for calibration. In some embodiments, a 3D model is constructed from a plurality of images of a particular eye.

Estimation component 308 estimates an enhanced user eye gaze. Estimation component 308 narrows eye information database 310 to a subset of the eye information having gaze lines corresponding to the at least one gaze target area determined by gaze target component 304. Estimation component 308 compares user eye information, such as the segmented plurality of images of the user's eye, with the narrowed subset of the eye information in database 310. The eye information stored in database 310 is also segmented according to the same comprehensive segmentation model as the images of the user's eye acquired by data component 302. The known gaze line of matching eye information in the subset of the eye information is identified as an enhanced estimated user eye gaze.

In this way, the first estimated gaze determined by gaze target component 304 through an analysis of images of the eye and identification of likely gaze targets informs and enhances estimation component 308, which performs an exemplar-based comparison of user eye information to reference information in eye information database 310. Estimation component 308 only analyzes a subset of the information in eye information database 310 that has known gaze lines that intersect the gaze target area determined by gaze target component 304. Fewer images to analyze means that estimation component 308 can more quickly estimate the user's eye gaze.

Intent component 312 determines a user intent based at least in part on the enhanced user eye gaze estimated by estimation component 308. As discussed above, high-speed cameras may be incorporated into HMDs, and the images of the user's eye acquired by data component 302 may be a series of high-speed images. A series of high-speed images can be used to measure acceleration and deceleration of the user's eye, which conforms to a projectile or ballistic pattern with equal acceleration and deceleration.

Changes in a user's gaze, both direction and acceleration, can indicate a user's intent. For example, a user's gaze changing horizontally from left to right may indicate that the user is reading. An abrupt movement may indicate a potential threat has emerged. Looking at a particular object, for example a restaurant sign, may cause a HMD to provide hours, price range, or specials to the user on a display. In another example, continued varied movement may indicate that the user is lost or unsure of her surroundings. A map option could be presented on a display based on a determination of the user's "lost" intent. Saccade movement and other involuntary movement such as blinking can be characterized and distinguished from voluntary, deliberate movement. Intent can be determined or inferred through a variety of algorithms based on acceleration/deceleration (as determined by analyzing a plurality of images) or a series of movements that indicate a particular type of activity or action.

In some embodiments, a database of user-specific movements is developed over time. As users interact with the system, the system begins to learn, through machine learning or other techniques, patterns and movements that are particular to the user and the intents that correspond to those patterns and/or movements.

In some embodiments, confidence values are assigned to the first estimated gaze determined by gaze target component 304 and/or the enhanced estimated user eye gaze determined by estimation component 308. In one embodiment, the enhanced estimated user eye gaze is not provided unless the combination of the first estimated gaze confidence score and the enhanced estimated user eye gaze confidence score exceed a predetermined threshold. In some embodiments, the confidence values affect the intent determined or inferred by intent component 312. In other embodiments, a lower confidence value in the first estimated gaze may be compensated for by a larger gaze target area, which causes estimation component 308 to analyze a larger number of images.

In some embodiments, the enhanced estimated user eye gaze is compared with the first estimated gaze. The accuracy of the enhanced estimated user eye gaze is confirmed when the enhanced estimated user eye gaze varies less than a threshold from the first estimated gaze. The threshold may be user defined or set automatically by the system and may be a specific numerical value, percentage, or a statistical value such as a standard deviation. In some embodiments, the enhanced estimated user eye gaze is only provided when the enhanced estimated user eye gaze is confirmed.

Figure 6:
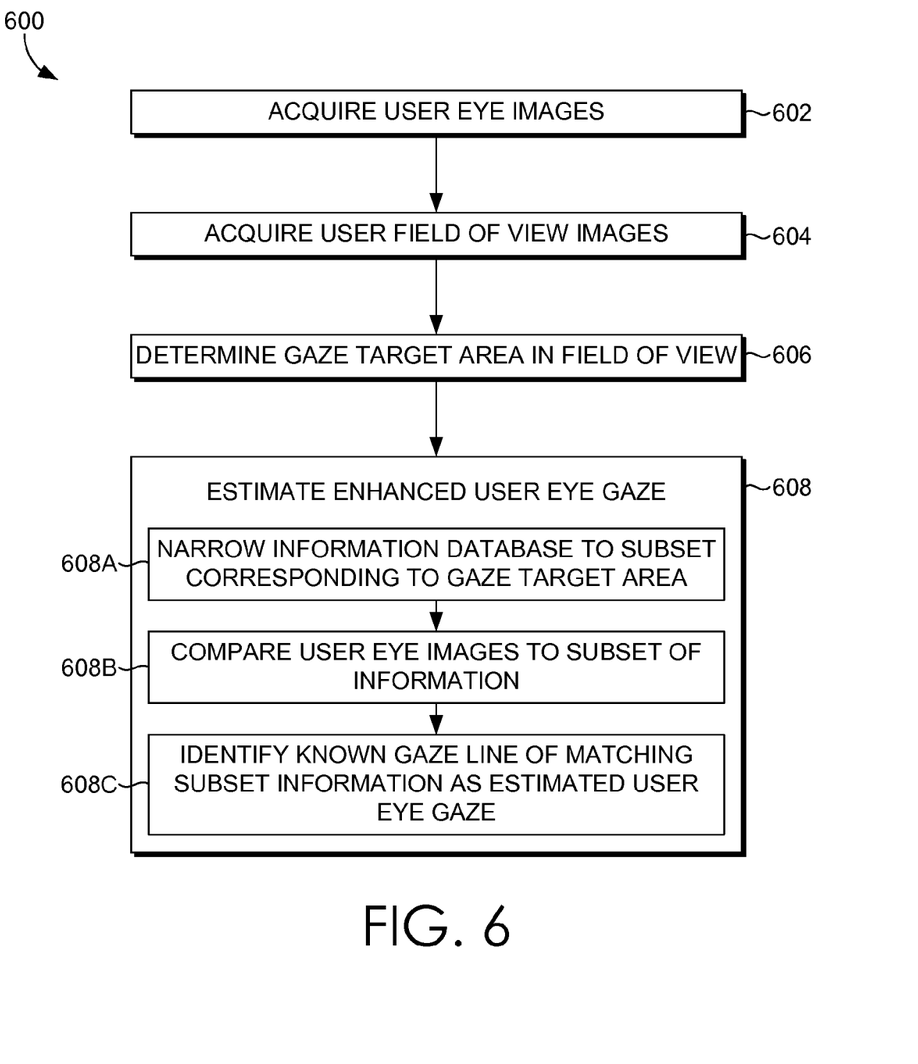
FIG. 6 is a flow chart of an exemplary method for estimating user eye gaze in accordance with an embodiment of the present invention.

FIG. 6 illustrates a method 600 of estimating user eye gaze. User eye images are acquired in step 602. The user eye images may be acquired by high-speed, inward-facing cameras mounted on an HMD. At least one image showing at least part of the user's field of view is acquired in step 604. The field of view image may be acquired by an outward-facing camera mounted on an HMD. In step 606, at least one gaze target area in the at least one image of at least part of the user's field of view is determined based on at least one of the plurality of images of the user's eye. In step 608, an enhanced user eye gaze is estimated by steps 608A-608C. In step 608A, a database of eye information and corresponding known gaze lines is narrowed to a subset of the eye information having gaze lines corresponding to the at least one determined gaze target area. In step 608B, user eye information derived from the plurality of images of the user's eye is compared with the narrowed subset of the eye information. In step 608C, the known gaze line of matching eye information in the subset of the eye information is identified as an enhanced estimated user eye gaze. In method 600, step 608B may or may not be based on a comprehensive segmentation of the user's eye.

Figure 7:
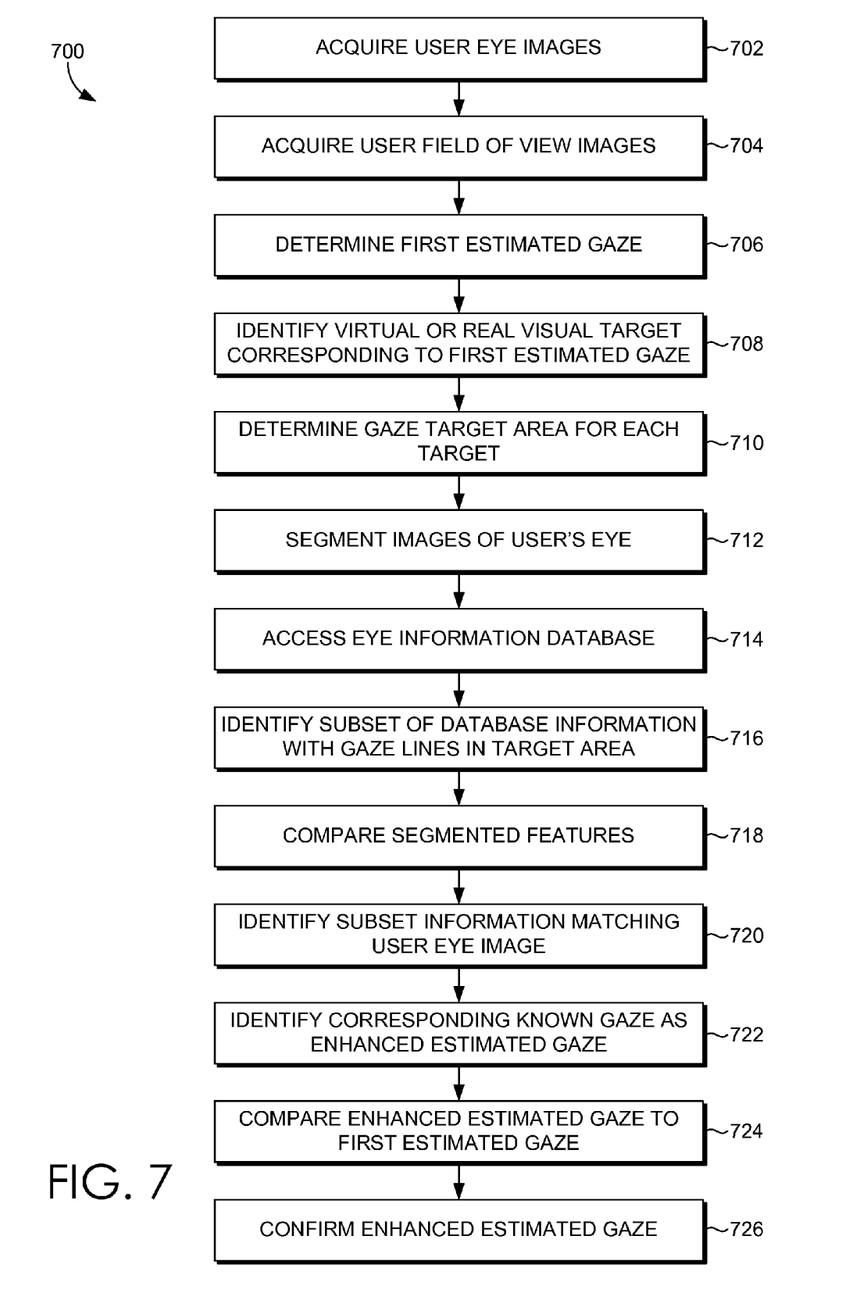
FIG. 7 is a flow chart of an exemplary method for estimating user eye gaze in accordance with an embodiment of the present invention in which a comprehensive segmentation model is used to derive a plurality of eye features for matching comparison.

FIG. 7 illustrates a method 700 for estimating user eye gaze in accordance in which a comprehensive segmentation model is used to derive a plurality of eye features for matching comparison. In step 702, user eye images are acquired. In step 704, images of at least part of the user's field of view are acquired. A first estimated gaze is determined in step 706. In step 708, at least one virtual or real visual target is identified corresponding to the first estimated gaze. In step 710, a gaze target area is determined for each target. In step 712, images of the user's eye are segmented according to a comprehensive segmentation model. A database of eye information and known gaze lines is accessed in step 714. In step 716, a subset of eye information in the database is identified that has known gaze lines in the gaze target area. In step 718, the segmented features of the images of the user's eye are compared to the identified subset of information. Eye information from the subset that matches the image of the user's eye is identified in step 720, and the known gaze corresponding to the matching information is identified as the enhanced estimated gaze for the image of the user's eye in step 722. In step 724, the enhanced estimated gaze is compared to the first estimated gaze. The enhanced estimated gaze is confirmed in step 726 when the enhanced estimated gaze varies less than a threshold percentage from the first estimated gaze.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:

1. One or more computer storage media devices storing computer-executable instructions for performing a method for estimating user eye gaze, the method comprising:
   determining at least one gaze target area by:
      acquiring a plurality of images of a user's eye captured via at least one first image sensor on a head-mounted device,
      acquiring at least one image of at least part of the user's field of view captured via at least one second image sensor on the head-mounted device,
      determining the at least one gaze target area within the at least one image of the at least part of the user's field of view based on analysis of at least one of the plurality of images of the user's eye; and
   estimating an enhanced user eye gaze using the at least one gaze target area by:
      identifying, using a database that maps eye information to known gaze lines, a narrowed subset of the known gaze lines that intersect the at least one gaze target area,
      identifying, from the database, a narrowed subset of the eye information that corresponds with the narrowed subset of the known gaze lines,
      comparing user eye information derived from at least one the plurality of images of the user's eye to the narrowed subset of the eye information,
      identifying first eye information in the narrowed subset of the eye information as matching at least a portion of the user eye information derived from at least one of the plurality of images of the user's eye, and
      identifying a first known gaze line corresponding with the first eye information in the narrowed subset of the eye information as an enhanced estimated user eye gaze.

2. The computer storage media devices of claim 1, wherein the at least one gaze target area is determined by: determining a first estimated gaze based on at least one of the plurality of images of the user's eye; identifying at least one virtual or real visual target in the at least one image of at least part of the user's field of view corresponding to the first estimated gaze; and for each virtual or real visual target, determining a gaze target area in the user's field of view encompassing at least part of the corresponding virtual or real visual target.

3. The computer storage media devices of claim 2, wherein the first estimated gaze is determined based on an estimated pupil center and an estimated cornea center of the user's eye.

4. The computer storage media devices of claim 2, wherein a virtual target is an object viewable by the user on a display area of the head-mounted device.

5. The computer storage media devices of claim 2, further comprising: assigning the first estimated gaze a confidence score; assigning the enhanced estimated user eye gaze a confidence score; and providing the enhanced estimated user eye gaze when the combination of the first estimated gaze confidence score and the enhanced estimated user eye gaze confidence score exceed a predetermined threshold.

6. The computer storage media devices of claim 2, further comprising: comparing the enhanced estimated user eye gaze with the first estimated gaze; and confirming the enhanced estimated user eye gaze when the enhanced estimated user eye gaze varies less than a threshold from the first estimated gaze.

7. The computer storage media devices of claim 1, wherein comparing user eye information comprises segmenting the plurality of images of the user's eye and the region around the user's eye into a plurality of features according to a comprehensive segmentation model and comparing the plurality of features with the narrowed subset of eye information, and wherein the eye information stored in the database is also segmented according to the comprehensive segmentation model.

8. The computer storage media devices of claim 1, further comprising constructing a 3D model of the user's eye based on the plurality of images of the user's eye, and wherein comparing user eye information comprises comparing the 3D model of the user's eye with the narrowed subset of eye information.

9. The computer storage media devices of claim 1, further comprising determining a user intent based at least in part on the estimated enhanced user eye gaze.

10. The computer storage media devices of claim 9, further comprising initiating an action on a display area of the head-mounted device based at least in part on either the estimated enhanced user eye gaze or the determined user intent.

11. The computer storage media devices of claim 9, wherein determining the user intent comprises determining a user eye acceleration or deceleration from the plurality of images of the user's eye.

12. The computer storage media devices of claim 11, wherein determining the user intent comprises (1) inferring a user activity based on the determined user eye acceleration or deceleration or (2) determining a user activity by comparing the determined user eye acceleration or deceleration to a database of user-specific movements.

13. The computer storage media devices of claim 11, wherein determining the user intent comprises comparing the determined user eye acceleration or deceleration to a database of involuntary or saccade movements to determine if the determined user eye acceleration or deceleration represents a deliberate user action.

14. An apparatus comprising:
one or more processors; and
one or more computer storage devices having a system embodied thereon including computer-useable instructions that, when used by the one or more processors, perform operations for estimate user eye gaze, the system including:
a data component that acquires a plurality of images of a user's eye and at least one image of at least part of the user's field of view captured via at least one image sensor on a head-mounted device;
a gaze target component that determines at least one gaze target area within the at least one image of the at least part of the user's field of view based on analysis of at least one of the plurality of images of the user's eye;
an eye segmentation component that segments the plurality of images of the user's eye into a plurality of features according to a comprehensive segmentation model, the segmentation model including (1) the user's eye and (2) the region around the user's eye within approximately one and one half inches of the eyelids when open;
a database that corresponds eye information with known gaze lines; and
an estimation component that estimates an enhanced user eye gaze using the at least one gaze target area by:
identifying, using the database, a narrowed subset of the known gaze lines that intersect the at least one gaze target area,
identifying, from the database, a narrowed subset of the eye information that corresponds with the narrowed subset of the known gaze lines,
comparing the segmented plurality of images of the user's eye with the narrowed subset of the eye information, wherein the eye information stored in the gaze database is also segmented according to the comprehensive segmentation model, and
identifying first eye information in the narrowed subset of the eye information as matching user eye information derived from at least one of the plurality of images of the user's eye, and
identifying a first known gaze line corresponding with the first eye information in the subset of the eye information as an enhanced estimated user eye gaze.

15. The apparatus of claim 14, wherein the gaze target component determines the at least one gaze target area by:
determining a first estimated gaze based on at least one of the plurality of images of the user's eye;
identifying at least one virtual or real visual target in the at least one image of at least part of the user's field of view corresponding to the first estimated gaze; and
for each virtual or real visual target, determining a gaze target area in the user's field of view encompassing at least part of the corresponding virtual or real visual target.

16. The apparatus claim 14, further comprising an intent component that determines a user intent based at least in part on the enhanced user eye gaze estimated by the estimation component.

17. The apparatus of claim 16, wherein the intent component determines a user eye acceleration or deceleration from the plurality of images of the user's eye and determines a user intent based on at least one of (1) the determined user eye acceleration or deceleration or (2) a comparison between the determined user eye acceleration or deceleration and a database of user-specific movements.

18. A computer-implemented method for estimating user eye gaze in a head-mounted display system having a processor and memory, the method comprising:
acquiring a plurality of images of a user's eye captured via at least one first image sensor on the head-mounted display system;
acquiring at least one image of at least part of the user's field of view captured via at least one second image sensor on the head-mounted display system;
determining a first estimated gaze based on at least one of the plurality of images of the user's eye;
identifying at least one virtual or real visual target in the at least one image of at least part of the user's field of view corresponding to the first estimated gaze;
for each virtual or real visual target, determining a gaze target area in the user's field of view encompassing at least part of the corresponding virtual or real visual target;
segmenting at least one of the plurality of images of the user's eye into a plurality of features according to a comprehensive segmentation model, the segmentation model including (1) the user's eye and (2) the region around the user's eye within approximately one and one half inches of the eyelids when open;
accessing a database of eye information and corresponding known gaze lines;
identifying a subset of the eye information in the database having known gaze lines that intersect at least one of the determined gaze target areas;
comparing the segmented features of the at least one of the plurality of images of the user's eye with the subset of the eye information stored in the database to identify matching eye information; and
identifying a matching known gaze line corresponding to the matching eye information in the database as an enhanced estimated gaze.

19. The method of claim 18, further comprising:
comparing the estimated enhanced user eye gaze with the first estimated gaze; and
confirming the enhanced estimated user eye gaze when the enhanced estimated user eye gaze varies less than a threshold percentage from the first estimated gaze.

20. The method of claim 18, further comprising:
determining a user eye acceleration or deceleration from the plurality of images of the user's eye, and
determining a user intent based on at least one of (1) the determined user eye acceleration or deceleration or (2) a comparison between the determined user eye acceleration or deceleration and a database of user-specific movements.

* * * * *